INVENTOR.
JAMES F. WEIR

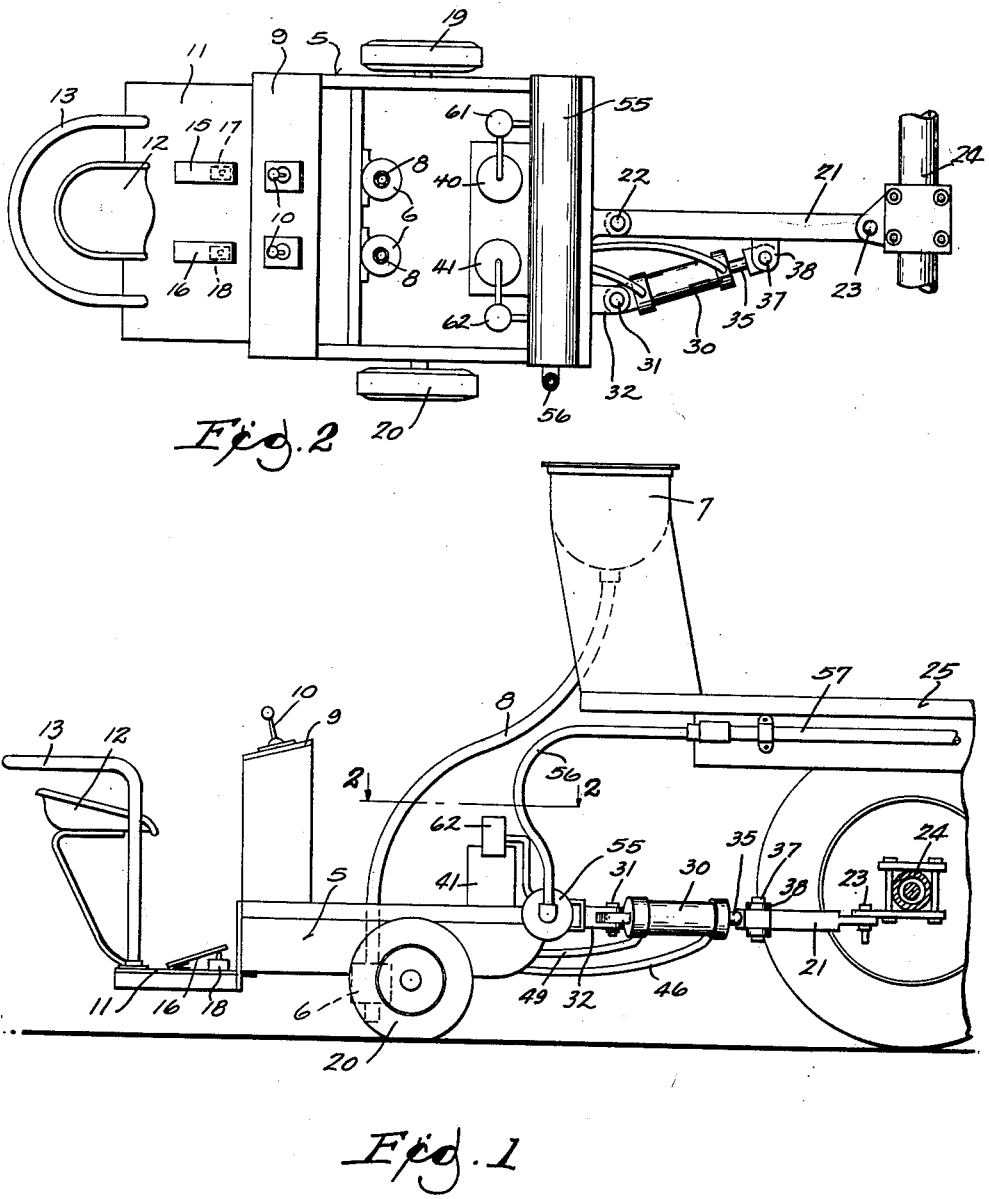

United States Patent Office 3,124,371
Patented Mar. 10, 1964

3,124,371
TRAILER STEERING CONTROL
James F. Weir, New Holstein, Wis., assignor to M-B-Corporation, New Holstein, Wis., a corporation of Wisconsin
Filed Nov. 15, 1960, Ser. No. 69,498
11 Claims. (Cl. 280—463)

This invention relates to a trailer steering control.

It is applicable wherever it is desired to regulate the path of a trailer in respect to the path of its towing truck or other tractor. The invention is described with respect to an embodiment in which the trailer is used for striping highways, this being a type of trailer having requirements which are particularly exacting as to positiveness and accuracy of control. In the embodiment selected to illustrate the invention, an operator rides on a two-wheeled trailer which has a pivoted tongue. In order that the operator's hands may be free to manipulate the paint guns used for striping purposes, pedal actuated means are provided to control the trailer steering mechanism.

In the preferred arrangement, the pedals actuate switches. The electrical circuits controlled by the respective switches desirably are not used directly to actuate the steering mechanism. Hence these switches operate solenoid valves which control air lines. Even air pressure desirably should not be used directly on the steering cylinders because of the likelihood of over-control and because of the impossibility of locking the steering mechanism in a selected position.

Accordingly, the invention contemplates a closed hydraulic system for operating the steering piston in its cylinder, with electrically operated shutoff valves which, when closed, lock the steering piston in adjustment. The arrangement is such that when either of the steering switches is closed, both of the normally closed shutoff valves are opened to permit the flow of hydraulic liquid while, at the same time, only one of two air valves is open to exert pressure on the hydraulic liquid to effect movement of the steering piston in the desired direction. The flow of hydraulic liquid is subject to a flow control valve which may be adjusted to give any desired speed of steering response in either direction.

In the drawings:

FIG. 1 is a view in side elevation of a trailer embodying the invention, portions of the tractor being fragmentarily illustrated.

FIG. 2 is a plan view of the trailer shown in FIG. 1, portions of the paint and air lines to be broken away on the section indicated at 2—2 in FIG. 1.

Figure 3:
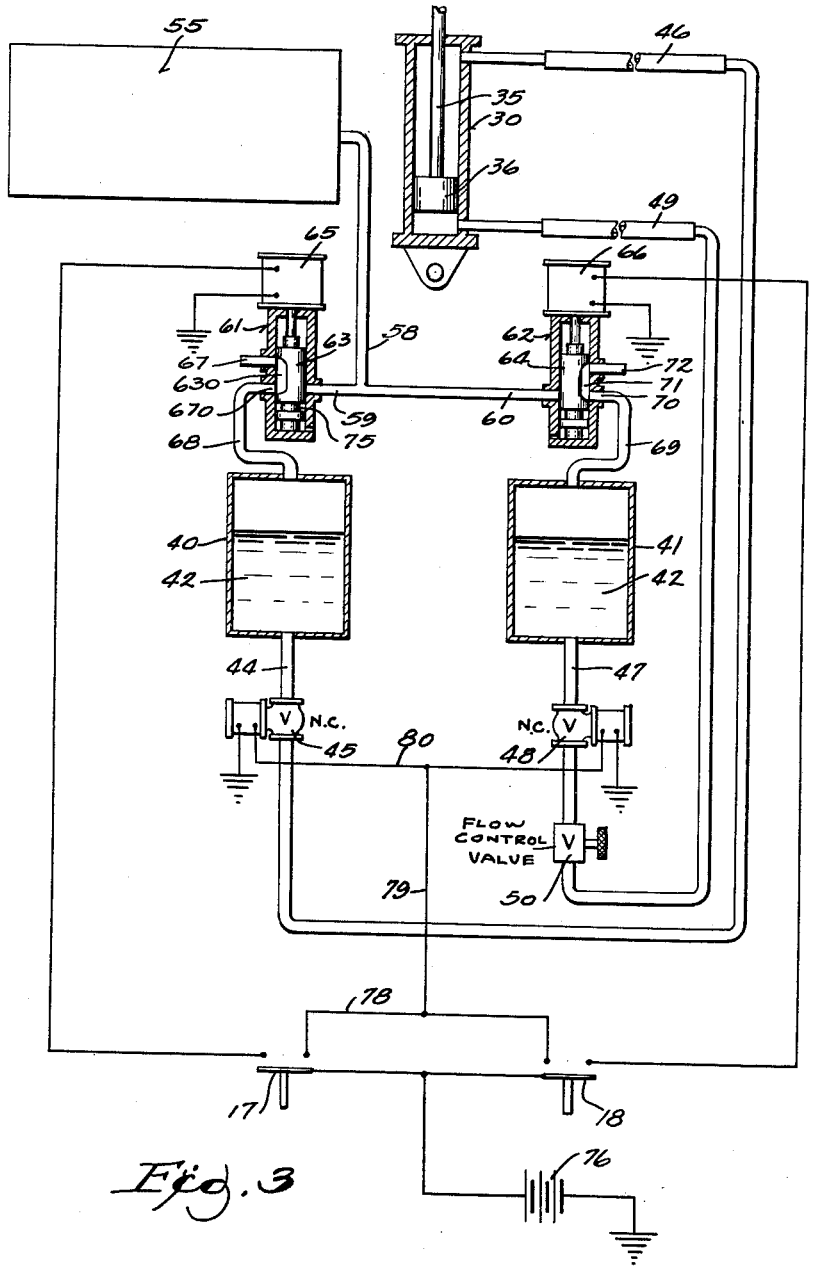
FIG. 3 is a diagrammatic view of the parts and their pneumatic and hydraulic electrical connections.

The trailer frame 5 has one or more paint guns 6 connected with a paint reservoir 7 by hoses 8. While the paint gun operation is not material to the present invention, it may be noted that there is a control panel 9 having control levers 10 for the respective guns.

Behind the panel, there is a platform 11 and a seat 12 for the operator with an arm rest and guard 13. In convenient proximity to the seat, the platform is provided with left and right foot pedals at 15 and 16 which control the switches 17, 18, respectively, for regulating steering movement.

The trailer frame 5 has wheels 19 and 20 and a tongue or tow bar 21 which is pivoted to the trailer frame at 22 and it is pivoted at 23 to a yoke connected to the axle 24 of a tractor vehicle 25.

For the purpose of steering the trailer so that its path of movement can be guided independently of that of the tow vehicle, an obliquely disposed ram comprises a steering cylinder 30 pivotally connected at 31 with a bracket 32 on the trailer. The piston rod 35 of piston 36 reciprocable in cylinder 30 is pivoted at 37 to a yoke 38 connected with the trailer tongue 21.

The ends of cylinder 30 are connected, at opposite sides of the piston 36, with hydraulic reservoirs 40 and 41 conveniently located on the trailer frame as shown in FIG. 2. In practice, each of the reservoirs 40 and 41 will contain hydraulic liquid as indicated at 42. These reservoirs will only be partially filled with liquid since the hydraulic circuit between them is a closed circuit such that any liquid displaced from either end of the cylinder 30 must be received into the connected reservoir.

As exemplified in the diagram of FIG. 3, the connection of reservoir 40 to the forward end of cylinder 30 is made by means of a pipe 44 having a solenoid valve at 45 which includes conventional means for normally closing the valve and which is connected by a flexible hose 46 with the trailer end of cylinder 30. The hydraulic liquid reservoir 41 is connected with the tractor end of cylinder 30 by means of a pipe 47 controlled by a solenoid valve 48 which includes conventional means for normally closing the valve and which leads via flexible hose 49 to the cylinder 30. Since the hydraulic liquid is virtually incompressible, it is immaterial where, in the circuit described, the flow control valve 50 is located. As shown, it is in the pipe 47. In any event, there is a solid column of liquid 42 from the reservoir 40 through the pipe 44 to the piston in cylinder 30 and thence from the other side of piston 36 back from cylinder 30 through pipe 47 to reservoir 41. The setting of the flow control valve 50 will regulate with accuracy the rate at which the piston 36 can be actuated in cylinder 30 when liquid is displaced from one reservoir to the other by the means hereinafter disclosed.

If the solenoid valves 45 and 48 are closed, as is normally the case, the piston 36 will be locked in the position to which it has been adjusted in cylinder 30, thereby fixing the angular relation of tongue 21 to trailer frame 5.

Hydraulic liquid is displaced pneumatically in either of the reservoirs 40 or 41 toward the other through the cylinder 30 to move piston 36 from one position to another for trailer steering purposes. The source may be air stored under pressure in the air supply chamber 55, to which it may be supplied through a flexible hose 56 from an air supply line 57 on the truck. The air under pressure passes through a pipe 58 and branches 59 and 60 to spool valve casings 61 and 62 in which the spools 63 and 64 are moved by solenoids 65 and 66. In the normal positions in which the spool valves are shown, each of them vents one of the hydraulic reservoirs 40 and 41 to atmosphere. Spool valve 63 has a passage 630 which connects port 67 and port 670. The port 67 is a vent port. Port 670 communicates through pipe 68 with reservoir 40.

Similarly, pipe 69 connects reservoir 41 with port 70 in valve casing 62, being there connected by spool valve passage 71 with vent 72.

When valve 63 is actuated by solenoid 65 in an upward direction as viewed in FIG. 3, the vent port 67 is closed and the annular passage 75 of spool valve 63 places the air supply line 59 in communication through port 670 with pipe 68 leading to reservoir 40, thus subjecting to pressure the oil 42 in reservoir 40.

The solenoid 65 is supplied with current from a suitable source 76 through the left foot switch 17 controlled by pedal 15. At the same time that the solenoid is energized, this switch closes a circuit through conductors 78, 79 and 80 connecting the shutoff valves 45 and 48 to each other and to the switch 17, whereby both of the normally closed shutoff valves 45 and 48 are opened, thereby permitting liquid to flow from reservoir 42 into the tractor end of cylinder 30 to actuate the piston 36 in a direction to contract the overall length of the steering ram, the liquid on the other side of the piston being exhausted through the valve 48 into hydraulic reservoir 41.

If the operator had actuated the right foot pedal 16 to close switch 18, the circuit from battery 76 would have been closed to energize solenoid 66 to admit air from tank 55 through pipes 58 and 60 and valve casing 62 and pipe 69 into the hydraulic liquid reservoir 41. Simultaneously, the switch 18 would close the circuits through conductors 78, 79 and 80 to energize both of the normally closed shutoff valves 45 and 48 to open such valves, thereby permitting the advance of piston 36 in cylinder 30, the displaced liquid being returned from the forward end of cylinder 30 to the reservoir 40.

Thus, manipulation of the righthand pedal will extend the hydraulic steering ram to thrust tongue 21 angularly to the left with respect to the trailer frame 5, whereby the trailer will move to the right. Conversely, if the left pedal 15 is depressed, switch 17 will be closed with the result that the overall length of the hydraulic ram will be retracted to pivot the tongue angularly to the right, whereby the trailer will move to the left.

In either case, the rate of steering movement is controlled by the flow control valve 50 which can be set to regulate the response of the operator thereby preventing over-control.

In either case, the normally closed solenoid valves 45 and 48 preclude any movement of hydraulic liquid into or out of the cylinder 30, thus locking the angular position of the trailer tongue with respect to the trailer frame in the position to which it has been adjusted. Yet the slightest touch of the operator upon either pedal will open the normally closed valves 45 and 48 and will open only one of the solenoid actuated pneumatic control spool valves to subject the appropriate hydraulic reservoir to pressure for effecting hydraulic flow through the closed part of the system to bring about the desired steering movement.

The fact that the ram operates in a closed system is of great advantage in a device of this character. If the steering ram were operated directly by pneumatic pressure, it could not readily be locked because pneumatic fluid is compressible and therefore would yield in response to highway irregularities. The system disclosed has all the advantages of pneumatic operation with none of the disadvantages. The controls are locked and remain locked until released by a purposeful steering operation, the arrangement being such that the application of pressure on either side of the system will automatically release the valves on both sides. The regulation of rate of response is another feature which is only achieved with accuracy because the flow control valve is in a hydraulically closed part of the system.

In addition to the advantages of the combination pneumatic-hydraulic arrangement disclosed, there is also considerable advantage in the double acting ram and its connection directly from the trailer tongue to one side of the trailer frame.

I claim:

1. A steering control comprising the combination with steering means, of ram means in operative connection with the steering means and having opposing hydraulic connections, separate reservoir means in closed circuit communication through said connections with the steering ram means, shutoff means in the respective connections for precluding hydraulic flow between the respective reservoir means and the steering ram means and including means normally closing said shutoff means, means for subjecting hydraulic liquid in one of the reservoir means to pressure tending to actuate the steering ram means to turn the steering means in one direction, and means connected to each of said shut-off means for concurrently opening both of said shutoff means to accommodate hydraulic flow from the one reservoir means to said ram means and flow from said ram means to the other reservoir means.

2. The device of claim 1 in further combination with a flow control valve in circuit between said ram means and one of said reservoir means for regulating the rate of liquid displacement.

3. A trailer steering device comprising the combination with steering means, of steering piston means having operative connection with said steering means, and steering cylinder means in which the steering piston means is reciprocable, the steering cylinder means comprising a plurality of cylinder chambers, separate reservoirs containing a hydraulic liquid in closed circuit connection with said steering cylinder means whereby displacement of liquid from one reservoir to said cylinder means requires reception of liquid from said steering cylinder means into the other of said reservoirs, normally closed valve means precluding flow between each of the reservoirs and the steering cylinder means, and means connected to one of said reservoirs and to both of said normally closed valve means for concurrently applying fluid pressure to said one reservoir and for opening both of said normally closed valve means.

4. The device of claim 3 in further combination with a flow control valve in circuit between said cylinder means and one of said reservoirs for regulating the rate of liquid displacement.

5. The device of claim 3 in which means for supplying pressure comprises a source of gas under pressure, and a gas valve for admitting gas from said source to one of said reservoirs, the other reservoir being provided with vent means.

6. A trailer steering device comprising the combination with steering means, of a piston having operative connection with said steering means, and a cylinder in which the piston is reciprocable, separate reservoirs containing a hydraulic liquid in closed circuit connection with the opposite ends of said cylinder whereby displacement of liquid from one reservoir to said cylinder requires reception of liquid from said cylinder into the other of said reservoirs, normally closed valve means precluding flow between each of the reservoirs and the cylinder, and means connected to one of said reservoirs and to both of said normally closed valve means for concurrently applying fluid pressure to said one reservoir and for opening both of said normally closed valve means.

7. A steering device comprising the combination of a trailer having a tongue in pivotal connection therewith, and steering means therefor including a piston connected with one of said trailer and said tongue and a cylinder in which the piston is reciprocable, said cylinder being connected with the other of said trailer and said tongue, separate reservoirs containing a hydraulic liquid in closed circuit connection with opposite ends of said cylinder whereby displacement of liquid from one reservoir to said cylinder requires reception of liquid from said cylinder into the other of said reservoirs, normally closed valve means precluding flow between each of the reservoirs and the cylinder, and means connected to one of said reservoirs and to both of said normally closed valve means for concurrently applying fluid pressure to said one reservoir and for opening both of said normally closed valve means.

8. The combination with a trailer and a tongue in pivoted connection therewith, of a steering mechanism for the trailer comprising ram means connected between the trailer and the tongue, the ram means including cylinder means and piston means for pivoting the tongue in opposite directions respecting the trailer, separate hydraulic liquid reservoirs in closed circuit liquid connection with the cylinder means and therethrough with each other, whereby liquid displaced from one of said reservoirs to effect piston movement to displace the trailer tongue also effects movement of hydraulic liquid from the cylinder means into the other reservoir, means for locking the trailer tongue in adjusted angular position with respect to the trailer, said means comprising separate shutoff valve means in the hydraulic circuit leading to each of said reservoirs and including means normally closing said shutoff valve means, means for admitting fluid pressure into one of said reservoirs and thereby tending to displace liquid therefrom, and means connected to each of said shutoff valve means for concurrently opening both of said shutoff valves to accommodate liquid flow between the cylinder means and the respective reservoirs.

9. The device of claim 8 in which the means for exerting fluid pressure is pneumatic and comprises a source of gas under pressure, valve means for selectively coupling said source with one of said reservoirs, and means for actuating the means for opening said shutoff valves when the pressure is admitted to either reservoir.

10. The combination with a trailer having a frame and a tongue pivoted thereto, of double acting ram means in pivotal connection with the trailer frame and with the tongue, said ram means including a piston and piston rod and a cylinder having hydraulic connections at opposite sides of the piston, hydraulic liquid reservoirs having liquid conduit connections at opposite ends of the cylinder, each of said last mentioned connections being provided with a normally closed shutoff valve having a solenoid operator, a flow control regulating valve in one of said connections, means for supplying gas under pressure, separate valve means for connecting said source selectively with each of said reservoirs and for venting the reservoir not connected with said gas supply means, solenoids connected with said gas valve means, and switches connected individually with said last mentioned solenoids for the selective actuation thereof, each of said switches having electrical connections for energizing the first mentioned solenoids to open said shutoff valves whenever either of said air valves is open.

11. The device of claim 10 in which respective switch means are provided with left and right foot pedals in operative connection for the closing of said switch means, the respective solenoids energized by the switch means being so connected that manipulation of the right pedal will cause trailer movement to the right and manipulation of the lefthand pedal will cause the trailer to move to the left.

References Cited in the file of this patent
UNITED STATES PATENTS

| | | |
|---|---|---|
| 1,314,153 | Schneider | Aug. 26, 1919 |
| 2,239,893 | Jackman | Apr. 29, 1941 |
| 2,316,397 | Briscoe | Apr. 13, 1943 |
| 2,373,167 | Cherry et al. | Apr. 10, 1945 |
| 2,878,034 | Wald et al. | Mar. 17, 1959 |
| 2,946,603 | Wald et al. | July 26, 1960 |